United States Patent

Kojima et al.

Patent Number: 5,739,626
Date of Patent: Apr. 14, 1998

[54] PIEZOELECTRIC SENSOR

[75] Inventors: Takao Kojima; Hideki Toyoda; Tetsuma Shimozato, all of Nagoya, Japan

[73] Assignee: NGK Spark Plug Co., Ltd., Nagoya, Japan

[21] Appl. No.: 865,993

[22] Filed: Apr. 9, 1992

[51] Int. Cl.$^6$ ............................................. H01L 41/08
[52] U.S. Cl. ..................................... 310/360; 310/338
[58] Field of Search ................................. 310/328, 338, 310/339, 360

[56] References Cited

U.S. PATENT DOCUMENTS

| | | | |
|---|---|---|---|
| 3,591,813 | 7/1971 | Coquin et al. | 310/360 X |
| 3,714,476 | 1/1973 | Epstein | 310/360 X |
| 3,727,084 | 4/1973 | Epstein | 310/360 X |
| 3,735,161 | 5/1973 | Perkins et al. | 310/360 X |
| 3,756,070 | 9/1973 | McElroy | 310/360 X |
| 3,858,065 | 12/1974 | Epstein | 310/360 X |
| 4,519,254 | 5/1985 | Sonderegger et al. | 310/338 X |
| 4,712,036 | 12/1987 | Gurich | 310/338 X |
| 4,893,049 | 1/1990 | Bundy et al. | 310/338 |
| 5,126,617 | 6/1992 | Lukasiewicz et al. | 310/338 |

FOREIGN PATENT DOCUMENTS

| | | | |
|---|---|---|---|
| 0041895 | 3/1977 | Japan | 310/360 |

*Primary Examiner*—Mark O. Budd
*Attorney, Agent, or Firm*—Darby & Darby

[57] ABSTRACT

An improved piezoelectric sensor for detecting pressure, vibration, acceleration or the like physical quantity is disclosed. The pressure sensor to be attached to a cylinder block of an internal combustion engine includes a main body adapted to be attached to the cylinder and defining an axially extending hole therewithin, a diaphragm attached to one end of the main body for closing the hole; and a piezoelectric element disposed within the hole so that the pressure within the cylinder is transmitted to the piezoelectric element through the diaphragm. The piezoelectric element is a circular or polygonal disc with a thickness of 0.3–1.5 mm and is formed of a single crystal piezoelectric ceramic having a Curie temperature greater than 500° C., such as LiNbO$_3$.

2 Claims, 7 Drawing Sheets

PIEZOELECTRIC SENSOR

BACKGROUND OF THE INVENTION

This invention relates generally to a piezoelectric sensor to be mounted on a body for detecting a physical quantity, such as pressure, acceleration or vibration, generated by the body and capable of converting a mechanical strain into an electrical signal. More particularly, the present invention is directed to a piezoelectric sensor to be mounted on a cylinder block of an internal combustion engine for detecting the internal pressure of the cylinder block.

It is known to use a piezoelectric sensor for detecting the inside pressure of a cylinder of an internal combustion engine. Such a sensor has a main body adapted to be attached to the cylinder block by threading engagement with a threaded hole provided in a wall thereof. The main body has a hole within which a piezoelectric element and a pressure transmitting bar are accommodated and which is closed by a diaphragm so that, when the sensor is attached to the cylinder block, the pressure inside of the cylinder block is transmitted through the diaphragm and the pressure transmitting bar to the piezoelectric element, whereby the pressure is converted into an electrical signal. As the piezoelectric element, lead titanate zirconate or lead titanate has been used.

The known piezoelectric sensor has been found to have a drawback that it is necessary to use the sensor in conjunction with cooling means adapted to maintain the sensor in a low temperature range, since otherwise the piezoelectric element deteriorates during use. More particularly, the piezoelectric sensor is generally exposed to a high temperature of about 500° C. so that the piezoelectric element is also subjected to a temperature as high as about 400° C. Since the Curie temperatures of lead titanate zirconate and lead titanate are about 250° C. and 350° C., respectively, the piezoelectric element is apt to cause depolarization which results in a deterioration of the piezoelectric characteristics thereof.

While such deterioration can be avoided by providing suitable cooling means for maintaining the element at a temperature below its the Curie temperature, the structure of the sensor becomes large and complicated. The known piezoelectric sensor has another drawback that the signal to noise ratio (S/N) tends to be lowered during use due to pyroelectric effect.

SUMMARY OF THE INVENTION

It is, therefore, an object of the present invention to provide a piezoelectric sensor which is devoid of the drawbacks of the known piezoelectric sensor.

Another object of the present invention is to provide a piezoelectric sensor which is suitably used for detecting a physical quantity of a body which is capable of being converted into a mechanical strain, such as an inside pressure or vibration of an internal combustion engine or acceleration of a vehicle.

It is a special object of the present invention to provide a piezoelectric sensor of the above-mentioned type which has a high heat resistance and has a long service life.

It is yet a further object of the present invention to provide a piezoelectric sensor of the above-mentioned type which has a high S/N ratio.

In accomplishing the foregoing object, there is provided in accordance with one aspect of the present invention a piezoelectric sensor for an internal combustion engine having a cylinder, which includes:

a main body adapted to be attached to the cylinder and defining an axially extending hole therewithin;

a diaphragm attached to one end of the main body for closing the hole; and a piezoelectric element disposed within the hole so that the pressure within the cylinder is transmitted to the piezoelectric element through the diaphragm, the piezoelectric element is a circular or polygonal disc with a thickness of 0.3–1.5 mm and is formed of a single crystal piezoelectric ceramic having a Curie temperature greater then 500° C.

In another aspect, the present invention provides a piezoelectric sensor for detecting a physical quantity of a body, which includes a casing to be mounted on the body, a piezoelectric element in the form of a disc disposed in the casing, and means for transmitting the physical quantity to the piezoelectric element as a mechanical strain so that the piezoelectric element outputs an electrical signal, the piezoelectric element being formed of $LiNbO_3$ and is polarized such that the direction of the polarization is oriented at an angle of 20° or less with respect to the X-Y plane thereof.

Lithium niobate ($LiNbO_3$) and lithium tantalate ($LiTaO_3$) have Curie temperatures of about 1,200° C. and about 650° C., respectively and exhibit a good heat resistance. These piezoelectric elements, however, are apt to be broken when cut with an ordinary cutting method using, for example, a diamond cutter, an ultrasonic cutter or a laser beam. Thus, at least a thickness of about 0.3 mm of the piezoelectric element is required for withstanding the cutting operation. A thickness of the element of at least 0.3 mm is also desirable to ensure both satisfactory accuracy in pressure receiving surfaces and good parallelism. Too large a thickness in excess of 1.5 mm, on the other hand, causes cracks of the piezoelectric element by thermal shock. The piezoelectric element preferably has a thickness of about 0.5–1.0 mm.

It is preferred that the direction of the polarization of the piezoelectric element is oriented at an angle of not greater than 20° with respect to the X-Y plane thereof for reasons of an improved S/N ratio.

BRIEF DESCRIPTION OF THE DRAWINGS

Other objects, features and advantages of the present invention will become apparent from the detailed description of the preferred embodiments of the invention which follows, when considered in light of the accompanying drawings, in which.

DETAILED DESCRIPTION OF THE PREFERRED EMBODIMENTS EMBODIMENTS OF THE INVENTION

Figure 1:
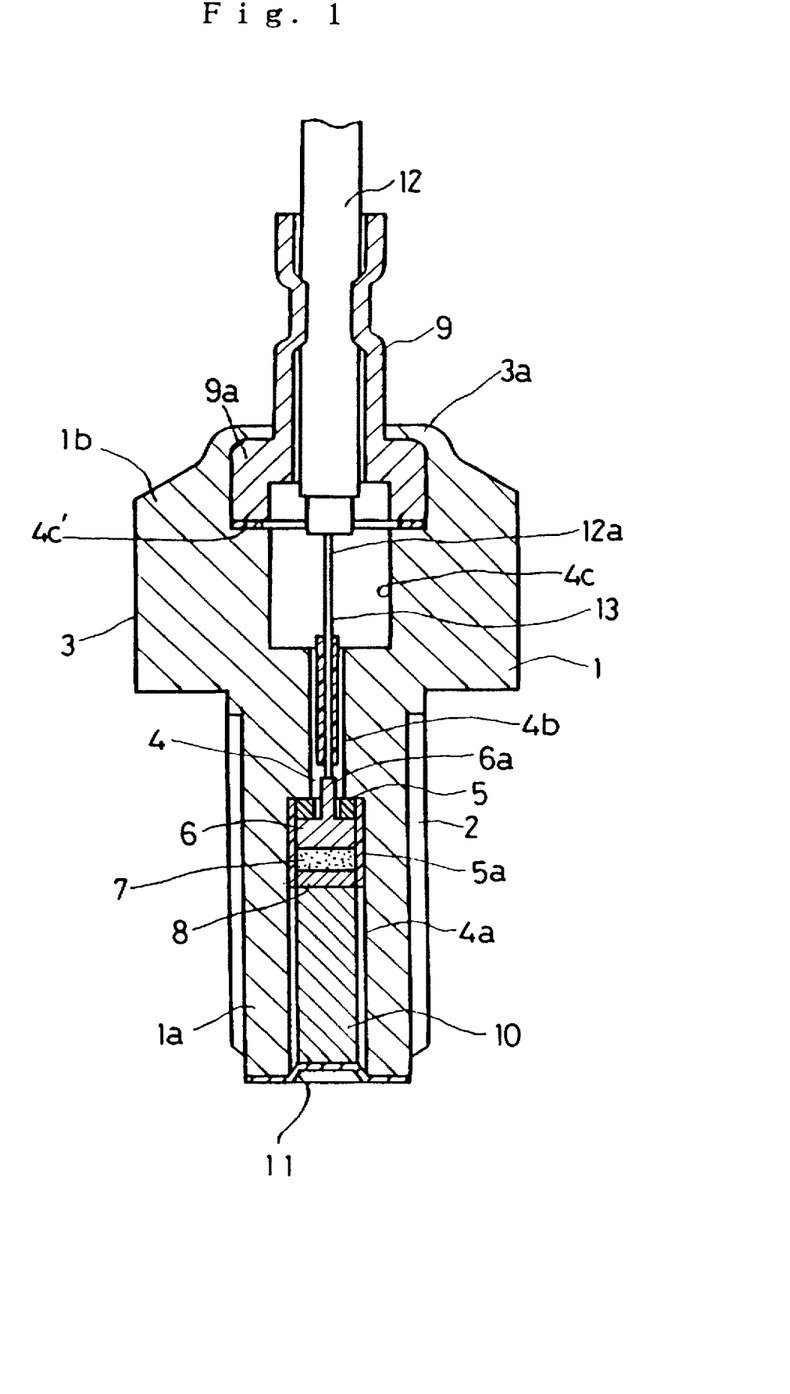
FIG. 1 is an elevational, cross-sectional view schematically showing one embodiment of piezoelectric sensor according to the present invention.

Referring now to FIG. 1, reference numeral 1 denotes a main body formed of a metal and having a lower portion 1a whose outer periphery is threaded to form a male thread 2 adapted to be in threading engagement with a female thread formed in the wall of a cylinder block (not shown) of an internal combustion engine. The main body has an intermediate portion 3 shaped to have a hexagonal cross section to facilitate the attachment of the main body 1 to the cylinder block by a suitable fastening means such as a spanner. The main body 1 has an axially extending through-hole 4 composed of a lower, medium diameter portion 4a, an intermediate, smaller diameter portion 4b and an upper, larger diameter portion 4c.

In the lower portion 4a of the through-hole 4, there are accommodated an electrically insulating ring 5, a first terminal 6, a piezoelectric element 7, a second terminal 8 and a pressure-transmitting bar 10 arranged in this order toward the lower open end portion of the main body 1. Designated as 5a is an electrically insulating material provided for insulating the piezoelectric element 7 from the main body 1. The first terminal 6 has a protrusion 6a extending through the insulating ring 5 and connected to a lead wire 13.

Figure 2:
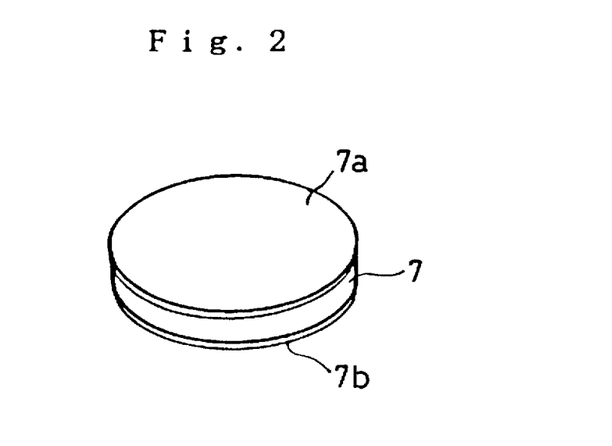
FIG. 2 is a perspective view schematically showing an example of the piezoelectric element to be used in the sensor of FIG. 1.
Figure 3:
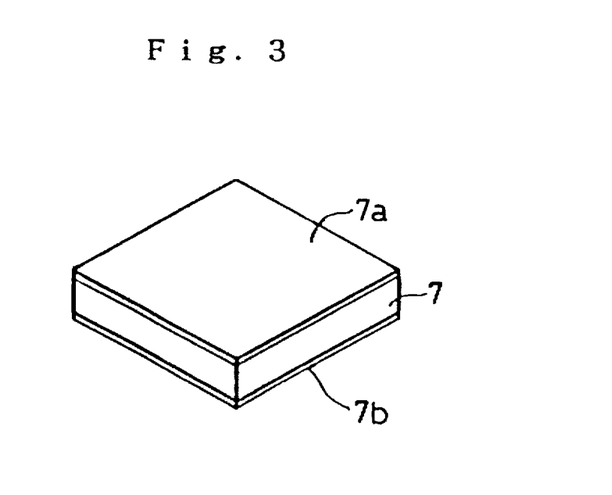
FIG. 3 is a perspective view schematically showing another example of the piezoelectric element.
Figure 4:
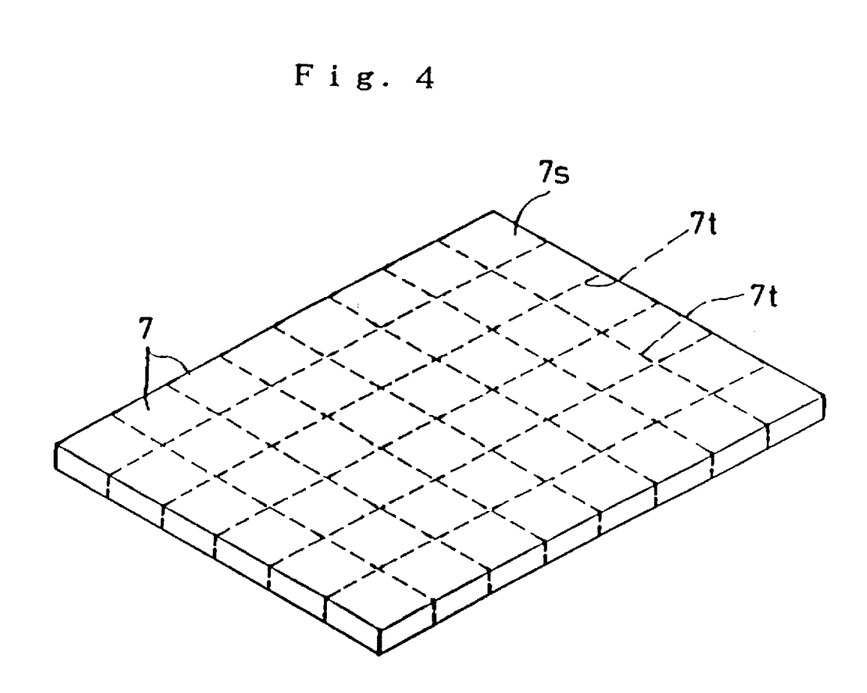
FIG. 4 is a perspective view explanatory of a method of fabricating piezoelectric elements.

The piezoelectric element may be in the form of a circular disc as shown in FIG. 2 or a square disc as shown in FIG. 3. From the standpoint of economy, the square type discs are preferred. FIG. 4 is a schematic representation of the method for the fabrication of square discs. By cutting a large plate of a single crystal piezoelectric material along a number of longitudinal and lateral lines 7t, a large quantity of discs in a square form can be easily produced. It is important that the piezoelectric element should have a thickness of 0.3–1.5 mm and should be formed of a single crystal piezoelectric ceramic having a Curie temperature of greater than 500° C. to ensure improved heat resistance and resistance to thermal and mechanical shocks.

The piezoelectric disc 7 is provided with upper and lower electrodes 7a and 7b formed by plating, vacuum deposition or any other customarily employed manner. For reasons of improved adhesion, it is advisable to use an ink containing nickel, silver or the like metal dispersed in an organic medium for the formation of the electrodes 7a and 7b. In this case, it is preferred that, after the ink has been printed over both surfaces of the disc, the above-described first and second terminals 6 and 8 be superposed thereon and the resulting assembly be baked together, since very good electrical contact can be obtained.

Turning again to FIG. 1, the lower opening of the through-hole 4 is closed by a diaphragm 11 formed of a heat-resistant metal such as ICONEL, SUS630 stainless steel or the like alloy. The adjacent two of the above members accommodated within the lower portion 4a of the through-hole 4 are disposed in pressure contact with each other so that the pressure applied to the diaphragm 11 is transmitted to the piezoelectric element 7.

The larger diameter portion 4c has a stepped seat 4c' with which a widened portion 9a of a metal sleeve 9 is in pressing engagement. The above-described cable 12 is caulked with the sleeve 9 which, in turn, is tightly fixed to the main body 1 by an upper thin wall portion 3a of the main body 1 which is inwardly forcibly bent over the outer periphery of the widened portion 9a of the sleeve 9.

The cable 12 has a core wire 12a which is connected to the lead wire 13 extending through the small diameter portion 4b from the first terminal 6a so that the cable 12 is electrically connected to the piezoelectric element 7 through the upper electrode 7a. The lower electrode 7b of the piezoelectric element 7 is grounded to the main body 1 through the second terminal 8 and the pressure-transmitting bar 10.

As a result of the above construction, when the main body 1 is attached to a cylinder block of an internal combustion engine with the external thread 2 being in engagement with a female thread of the cylinder block, the pressure within the cylinder block is transmitted to the piezoelectric element 7 through the diaphragm 11 and the pressure-transmitting bar so that the piezoelectric element outputs an electrical signal through the cable 12.

Figure 7:
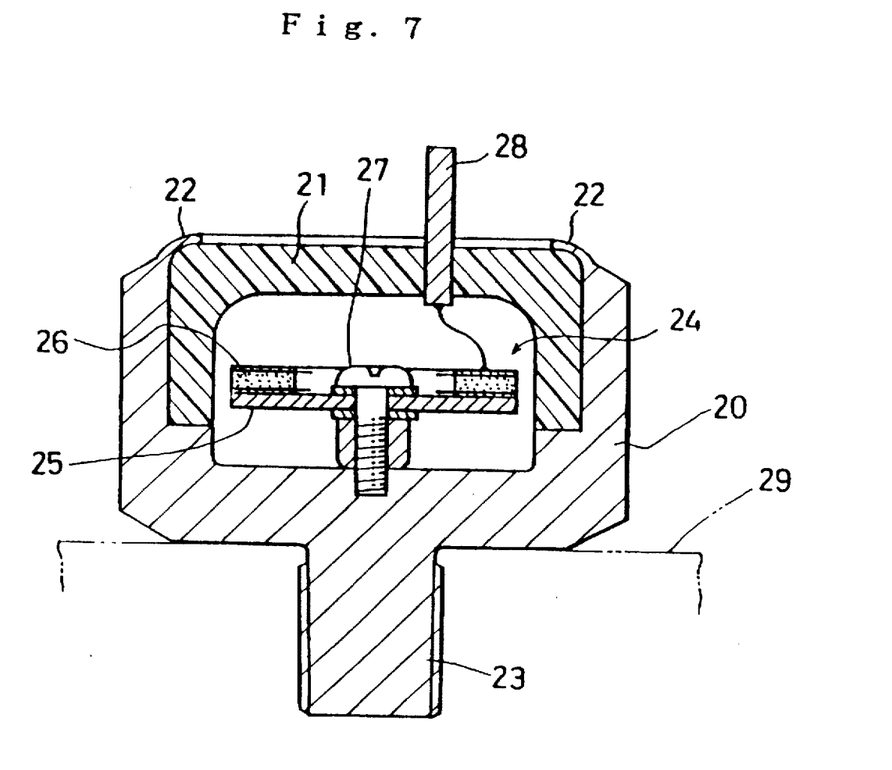
FIG. 7 is an elevational, cross-sectional view showing another embodiment of piezoelectric sensor of the present invention.

FIG. 7 illustrates another embodiment of piezoelectric sensor according to the present invention, which is used for detecting the knocking of an internal combustion engine. Designated as 20 is a main body formed of a metal and having a lower protrusion 23 which extends coaxially with the main body 20 and whose outer periphery is threaded to form a male thread adapted to be in threading engagement with a female thread formed in the wall of a cylinder block 29 of an internal combustion engine. The main body 20 is shaped to have a hexagonal cross section to facilitate the attachment to the cylinder block 29 by a suitable fastening means such as a spanner. The main body 20 has a central bore whose top opening is closed by a lid 21 tightly secured to the main body 20 by by an upper thin wall portion 22 of the main body 20 which is inwardly forcibly bent over the outer periphery of the lid 21.

Accommodated within the bore of the main body 20 is a vibration sensor generally indicated as 24. The vibration sensor 24 has a thin metal plate 25 secured to the center of a lower base portion of the main body 1 with a bolt 27. A piezoelectric element 26 in the form of a ring is supported on the metal plate 25. The piezoelectric element 26 preferably is formed of a single crystal piezoelectric ceramic having a Curie temperature of more than 500° C. The piezoelectric element 26 is provided with electrodes on both surfaces thereof. One of the electrodes is electrically connected to a terminal 28 extending through and secured by the lid 21, with the other electrode being grounded to the main body 20 through the metal plate 25 and the bolt 27.

When the combustion chamber of the engine causes knocking, the shock is transmitted to the cylinder block as a mechanical vibration, which in turn is transmitted to the bolt 27 to cause the bolt 27 to vibrate. This vibration is transmitted to the piezoelectric element 26 so that a signal voltage is generated. By detecting the voltage, it is possible to detect the knocking of the engine.

Figure 8:
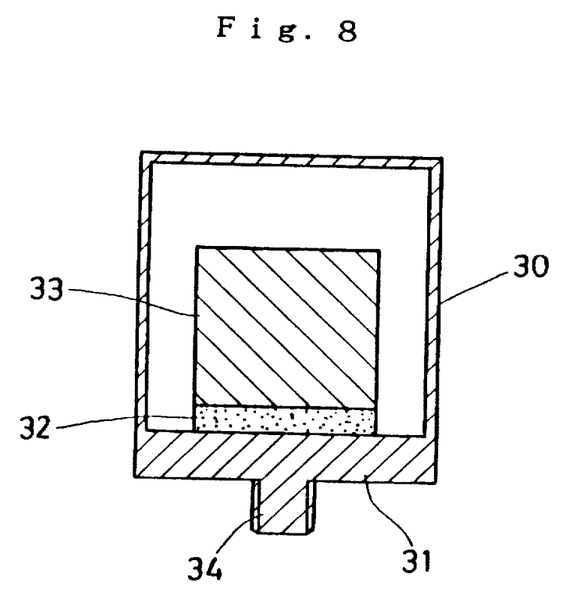
FIG. 8 is an elevational, cross-sectional view showing a further embodiment of piezoelectric sensor of the present invention.

FIG. 8 depicts a further embodiment of piezoelectric sensor according to the present invention, which is used as an acceleration detector of a moving body. Designated as 30 is a casing having a lower, thick wall base portion 31 from which a protrusion 34 downwardly extends coaxially with the casing 30. The outer periphery of the protrusion 34 is threaded to form a male thread adapted to be in threading engagement with a female thread formed in a moving body (not shown). Accommodated within the casing 30 is a piezoelectric element 32 directly placed on the base portion 31 of the casing 30. The piezoelectric element 32 is overlaid with a weight 33. The piezoelectric element 32 is formed of a single crystal piezoelectric ceramic having a Curie temperature of at least 500° C. and is provided with electrodes on both surfaces thereof for connection to lead wires (not shown). The above acceleration detecting sensor may be used, for example, as an actuator of an air bag of automobiles.

In the foregoing embodiments illustrated in FIGS. 1, 7 and 8, the piezoelectric element is preferably formed of a LiNbO₃ single crystal. It is also preferable to use a LiNbO₃ single crystal piezoelectric element which is polarized in the direction oriented at an angle of 20° or less with respect to the X-Y plane thereof for reasons of improved heat resistance and smallness in pyroelectricity. Since, in the sensors of FIGS. 7 and 8, the piezoelectric element is not directly exposed to such a high pressure as in the element of the sensor shown in FIG. 1, the thickness of the piezoelectric element is not limited to 0.3–1.5 mm.

The following example will further illustrate the present invention.

EXAMPLE

A LiNbO₃ single crystal was cut using ultrasonic wave cutting means into various shapes as shown in Table 1. Sample No. 4 only was made from a LiTaO₃ single crystal. Sample Nos. 2, 4 and 15 were in the form of squares, while the other samples were circular discs. Each of the piezoelectric discs thus formed was set in a piezoelectric sensor as shown in FIG. 1 using a diaphragm having a size as shown in Table 1. The diaphragms used in Samples Nos. 8 and 12–15 had a thickness of 0.2 mm while the other samples used diaphragms with a thickness of 0.1 mm. Each of the sensors thus constructed was mounted on an internal combustion engine of an automobile having the nominal specification of a cylinder volume of 2000 cc, a revolution of 6000 rpm and a maximum inside cylinder pressure of 70 kg/cm². After 100 hours running, the piezoelectric element was removed from the sensor for determining whether or not the element was broken. The results were as shown in Table 1.

Similar samples were also tested for their pressure dependency by measuring the relationship between the generated charge and the pressure within the cylinder. As a result, Samples Nos. 1, 4 and 7 showed slightly poor pressure dependency. Similar samples were further tested for their temperature dependency by heating with a band heater. As a result, Samples Nos. 1 and 7 were found to show significant temperature dependency. The partial pressure in the diaphragm is considered to have a great influence upon the properties of the piezoelectric elements. The poor pressure dependency of Sample No. 4 is attributed to the relatively poor piezoelectric characteristics of LiTaO₃.

Figure 5:
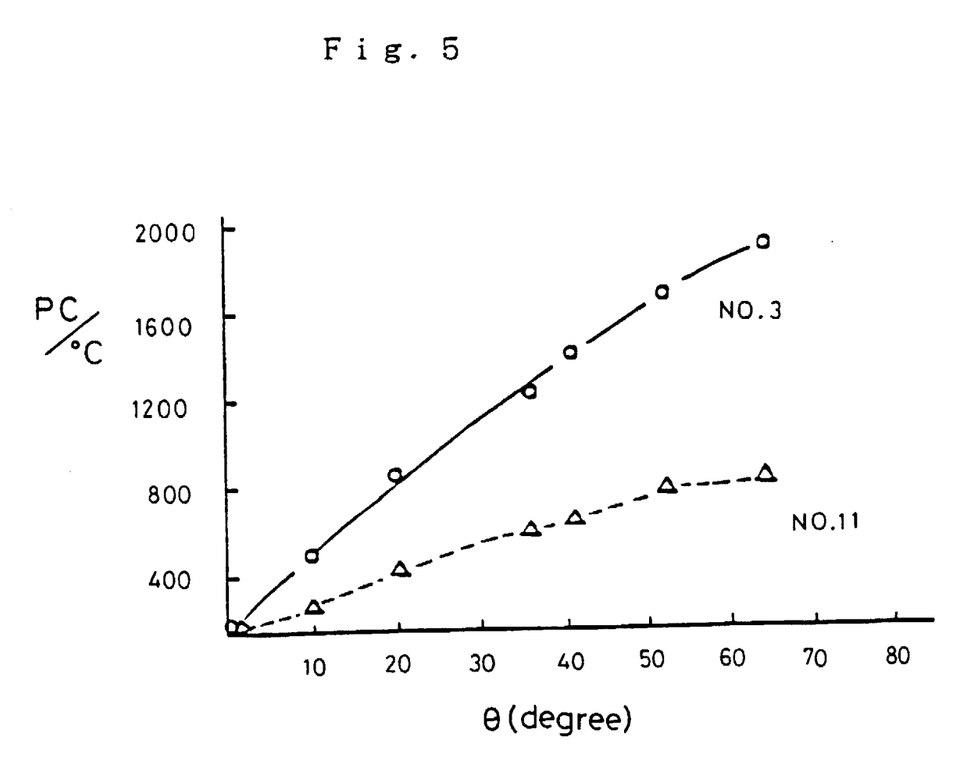
FIG. 5 is a graph showing a relationship between the charge produced by pyroelectric effect of a lithium niobate single crystal and the orientation angle in the Z-axis component of the polarization of the lithium niobate single crystal.
Figure 6:
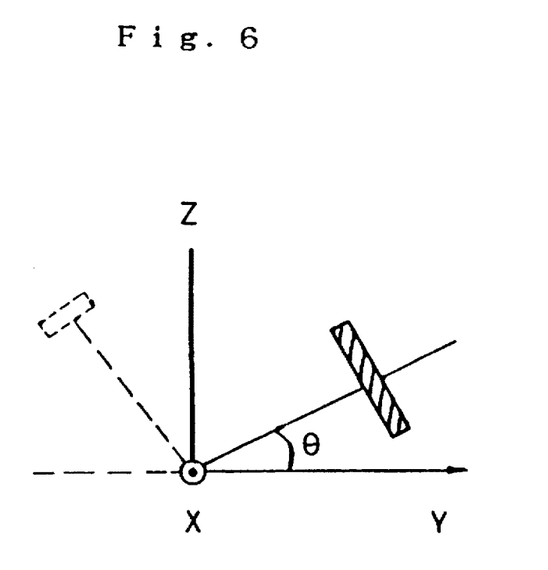
FIG. 6 is an explanatory view of the orientation of polarization on the XYZ coordinate.

Piezoelectric discs similar to those used in Samples Nos. 3 and 11 were tested for their pyroelectric characteristics. Thus various discs cut along various different directions were prepared and alternately immersed in a tank containing 0° C. water and in a tank containing 150° C. silicone oil. The test results are shown in FIG. 5 as a graph showing the relationship between the charge generated by the temperature change (ordinate) and the degree θ of the Z-axis component of the polarization (abscissa). As will be appreciated from the results shown in FIG. 5, it is preferred that the Z-axis component be small. The angle θ represents the deviation angle of the polarization direction from the plane (X-Y plane) toward the direction of the thickness (Z-axis). Namely, when the θ is 90°, the polarization direction is in parallel with the direction of the thickness. When the θ is 0°, the polarization direction is in parallel with the plane of the disc.

It was also found that an angle θ of 20° or less is preferable for reasons of attaining a pressure sensitivity of 10 atm or less. More preferred is an angle θ of 10° or less corresponding to a pressure sensitivity of 5 atm or less. In this case, filtering in the circuit becomes easy and good piezoelectric characteristics are obtainable.

Piezoelectric element samples having no Z-axis component (θ=0) showed almost no pyroelectricity and, thus, exhibited excellent characteristics. Among the samples having no Z-axis component (θ=0) and cut along Y- or X-axis, those cut along the Y-axis showed better piezoelectric characteristics (about 20 pC/N) than those cut along the X-axis (less than 10 pC/N) and were found to have good mechanical properties.

| | Piezoelectric Element | | Diaphragm | | |
|---|---|---|---|---|---|
| Sample No. | Diameter (or Side) (mm) | Thickness (mm) | Outer Diameter (mm) | Inner Diameter (mm) | Breakage Percentage (%) |
| 1 | 4 | 0.5 | 8 | 6.5 | 0 |
| 2 | 5* | 0.5 | 8 | 6 | 0 |
| 3 | 6 | 0.5 | 8 | 5 | 0 |
| 4** | 6* | 1.0 | 8 | 5 | 0 |
| 5 | 4 | 0.5 | 6 | 3 | 0 |
| 6 | 5 | 0.5 | 6 | 3 | 0 |
| 7 | 3 | 0.5 | 6 | 4 | 0 |
| 8 | 4 | 0.5 | 6*** | 4 | 0 |
| 9 | 3 | 0.7 | 5 | 2 | 0 |
| 10 | 3 | 0.7 | 4 | 1 | 0 |
| 11 | 4 | 0.5 | 7 | 5 | 0 |
| 12 | 4 | 0.3 | 7*** | 5 | 20 |
| 13 | 4 | 0.7 | 7*** | 5 | 20 |
| 14 | 3 | 1.0 | 7*** | 5 | 100 |
| 15 | 2.5* | 0.5 | 6*** | 4 | 80 |

*: Length of the side of the square piezoelectric element.
**: The element is formed of lithium tantalate single crystal piezoelectric material.
***: The thickness of the diaphragm is 0.1 mm.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. A piezoelectric sensor for an internal combustion engine having a cylinder, comprising:

a main body adapted to be attached to the cylinder and defining an axially extending hole therewithin;

a diaphragm attached to one end of said main body for closing said hole; and a piezoelectric element in the form of a circular or polygonal disc whose major surface is in the x-y plane disposed within said hole so that the pressure within said cylinder is transmitted transverse to the x-y plane of said piezoelectric element disc through said diaphragm, said piezoelectric element disc having a thickness in the range of 0.3–1.5 mm and being formed of a single crystal piezoelectric ceramic having a Curie temperature higher than the normal operating temperature of the engine and not less than 500° C. and being polarized such that the direction of the polarization is oriented at an angle of 20° or less with respect to said disc x-y plane.

2. A piezoelectric sensor as claimed in claim 1, wherein said piezoelectric element is formed of LiNbO₃ or LiTaO₃.

* * * * *

UNITED STATES PATENT AND TRADEMARK OFFICE
CERTIFICATE OF CORRECTION

PATENT NO. : 5,739,626

DATED : April 14, 1998

INVENTOR(S) :
Takao Kojima; Hideki Toyoda; Tetsuma Shimozato

It is certified that error appears in the above-indentified patent and that said Letters Patent is hereby corrected as shown below:

In the cover page of the patent, insert Section [30] Foreign Application Priority Data, as follows:

Insert therefor --April 27, 1991 [JP] Japan ...... 3-125414--

Insert therefor --December 6, 1991 [JP] Japan ...... 3-349644--

Signed and Sealed this

Twenty-third Day of June, 1998

*Attest:*

BRUCE LEHMAN

*Attesting Officer*　　　*Commissioner of Patents and Trademarks*